Patented Jan. 26, 1932

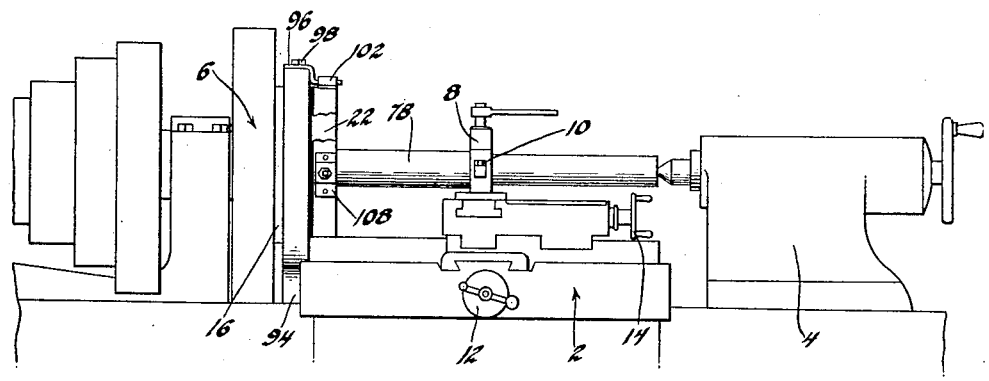

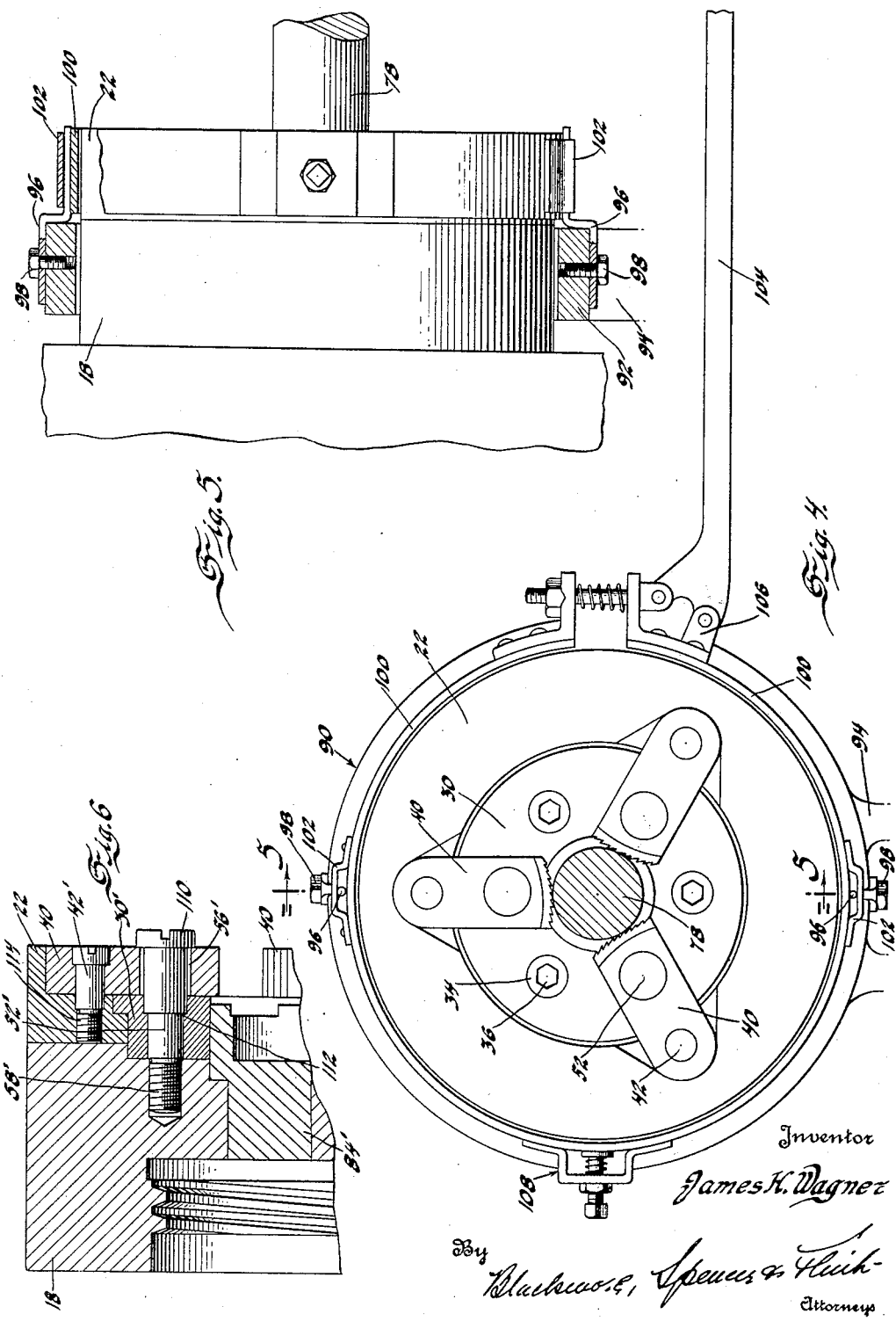

1,843,073

UNITED STATES PATENT OFFICE

JAMES H. WAGNER, OF MUNCIE, INDIANA, ASSIGNOR TO GENERAL MOTORS CORPORATION, OF DETROIT, MICHIGAN, A CORPORATION OF DELAWARE

CAM CHUCK

Application filed October 12, 1929. Serial No. 399,251.

This invention relates to chucks and has particular reference to a chuck adapted to be applied to a lathe for turning camshafts.

The chuck of the invention replaces the usual dog which engages the camshafts to cause the shaft to rotate with the work or live spindle of the headstock. According to the invention, the novel chuck is applied to and rotatable with the work spindle and engages the end of the shaft or work to cause it to rotate so that the cutting tool may form or shape the shaft or work.

The novel chuck of the invention comprises a head or block portion which is rigidly secured to the work spindle. A floating ring abuts the face of the block and is movably held thereon by means of a shoulder on the ring which is engaged by a peripheral flange of an annular member which is rigidly secured to the head. To the outer portion of the ring there are pivoted a plurality of jaws or cams, the inner portions of which are serrated to engage the work. Each of the jaws or cams has an opening adjacent its serrated portion in which openings there are received bolts which project inwardly through oblong openings in the annular member which secures the ring to the block. As the ring moves relative to the block, the oblong openings will limit and give positive direction to the movement of the jaws.

At the inner periphery of the ring, a plurality of recesses is provided and the annular securing member is provided with a plurality of pins one of which projects into each recess. Between each pin and the end of the recess a coil spring is mounted, which springs constantly urge the ring and jaws to a position which will cause the jaws to engage the work. By turning the ring in a direction opposite to that in which it is driven, the springs will be compressed to cause the jaws to swing on their pivots and remove them from contact with the work, to permit the ready withdrawal and reinsertion of the work.

In order to enable the accomplishment of a ready turning or rotating of the ring, a plurality of openings is provided at the periphery of the ring and by inserting a suitable tool, the ring may be rotated.

In the preferred form of the invention, a brake is positioned about the ring and rigidly mounted on a carrier permanently mounted on the frame of the lathe. As the machine is about to stop, the operator will apply the brake to the ring to hold it stationary and permit the headstock to rotate and compress the springs and cause the jaws to swing on their pivots and remove them from the work so that the shaft or other work in the machine may be readily removed.

On the drawings:

Figure 1 shows a side view of a portion of a lathe with the novel chuck and brake applied thereto.

Figure 2 is a view looking into the chuck toward the headstock of the lathe, with parts broken away to show a sectional view.

Figure 3 is a section on the line 3—3 of Figure 2.

Figure 4 is an enlarged detailed view of the brake applied to the chuck on the lathe.

Figure 5 is a view on the line 5—5 of Figure 4 with the brake and its mounting only shown in section.

Figure 6 is a sectional view corresponding to Figure 3 of a modification.

Referring to the drawings, the numeral 2 indicates the lathe as the whole. The lathe has the adjustable tail stock 4 and the headstock 6. An adjustable tool post is shown at 8 having a tool 10 and the means 12 for moving the tool post into and out of the work. The numeral 14 indicates the means for moving the tool post longitudinally of the lathe. These parts are conventional and per se form no part of the invention.

The novel chuck of the invention is indicated as a whole at 16 and is shown in detail in Figures 2 and 3. The chuck includes the head or block portion 18 fastened to the work spindle so as to be turnable therewith by means of suitable bolts 20. A floating ring 22 abuts the face of the head 18 as indicated at 24. The ring 22 is provided with a ledge or shoulder indicated at 26 over which there is received the peripheral flange 28 of an annular member 30 rigidly secured to the head or block 18 by means of the machine screws 32 having their heads 34 countersunk into the annular member 30. The flange 28 turnably holds the ring on the block 18. The heads 34 have the hexagonal opening 36 to allow for the application of a suitable tool.

Recesses or cut-out portions 38 are provided at the inner periphery of the ring 22 and a work-engaging cam or jaw 40 is pivoted in each recess by means of a bolt 42, the threaded end of which extends beyond the ring and has a collar or nut 44 secured thereon and held in place by means of a cotter key or taper pin 46. The head or block 18 is provided with suitable recesses 48 to receive the nuts 44.

The inner end of each jaw 40 is serrated as indicated at 50 and adjacent the serrated end a bolt 52 is secured in an opening 54. This bolt has its head flush with the cam 40 and pass through oblong or elongated openings 56 formed in the annular member 30. Each bolt 52 has the nut or collar 58 secured to its end by means of the taper pin or cotter key 60 and suitable openings 62 in the head 18 allow for the reception of the nut or collar 58.

Recesses 64 are provided at the inner periphery of the ring 22 and pins 66 rigidly mounted as at 68 in the annular member 30 project into each recess 64. A coil spring 70 is received in the recess 64 and is confined between the end 72 of the recess and the pin 66. Suitable squared heads 74 having bosses 76 hold the springs 70 in position. The function of the springs 70 is to at all times urge the ring and annular member 30 to the relative position shown in Figure 2. In this position of the parts, the cams or jaws 40 have a substantial tendency to engage in the work, indicated as a shaft 78. If the ring be rotated in the direction of the arrows in Figure 2, the springs will be depressed and the jaws 40 swung on their pivot 42 owing to the engagement of the pins 52 in the openings 56. This will release the jaws from the work and permit its ready removal or insertion. With the parts in the position shown in Figure 2, any tendency on the part of the work 78 to rotate relative to the jaws 40 will only cause the serrated portions 50 of the jaws 40 to dig the harder against the work and cause it to rotate with the chuck.

The head or block 18 and the annular member 30 are provided with the central concentric openings 80 and 82, respectively, for the reception of the centering member 84 to center and engage the work as shown at 86.

The ring 22 is provided with the plurality of openings 88 in its periphery the function of which openings is to permit the insertion of a suitable tool so that the ring may be rotated in a direction opposite to the arrows (Figure 2) to cause the jaws 40 to swing on their pivots 42 to release them from the work.

Referring to Figures 4 and 5, it will be seen that a novel means is provided for holding the ring 22 stationary to release the jaws 40 from the work. The means comprises a brake indicated as a whole at 90. The brake has the carrier 92 surrounding the block 18 and mounted on a support 94 secured to the lathe. The carrier 92 has secured thereto by means of the spring brackets 96 and bolts 98, the brake band 100. The brake band has the brackets 102 attached thereto which are received over the ends of the spring brackets 96. The brake band is normally free of the ring 22 so as to permit the head 18 and ring 22 to freely rotate. When the machine is about to stop the operator will swing the lever 104 to operate the linkage 106 to apply the band 100 of the brake. This will hold the ring 22 stationary and permit the annular member 30 and its pins 66 to rotate and depress the springs 64. This relative movement of the annular member 30 and ring 22 will cause the bolts 52 to swing the jaws 40 on their pivots 42 to swing them away from the work 78. The work may now be readily withdrawn and after a new piece of work is inserted the headstock is again driven. The driving motion will release the brake from the ring 18 to permit the jaws 40 to reengage the work 78 to drive the same. The frictional contact between brake and ring need not be very great; it is sufficient if it overcomes the tension to the springs 70 and may allow for a rather easy slipping between ring and band 100 if the operator should apply the brake too soon.

The brake is provided with an adjustment indicated as a whole at 108 which adjustment along with the springs 96 keeps the brake lining from dragging.

As a modification of the invention (Figure 6) instead of the bolt 52 being rigidly mounted in the jaw 40, it will be rigidly mounted as at 52' in the annular member 30' and the elongated opening 56' made in the jaw 40. It is also within the scope of the invention to screw-thread the end of the bolt 52' directly into the head 18 as at 58' and eliminate the nut or collar 58 and the taper or cotter pin 60. The head 110 of the bolt 52' may or may not be countersunk.

By providing a suitable shoulder 112 on the bolt 52', the bolt may also be used as a means to secure the annular member 30' to the head or block.

It is also within the scope of the invention to apply a centering attachment or work engaging member 84' directly at the central portion of the clutch and thereby eliminate the centering portion 84 of the headstock.

The jaws or cams 40 may also be secured to the ring 22 by means of the threaded engagement 114 between the bolt 42' and the ring.

I claim:

1. In a chuck, a chuck head or block, a floating ring mounted on said head or block, a plurality of work engaging members mounted on said block and ring, and a plurality of springs between said block and ring and urging said members to work engaging position.

2. In a chuck, a chuck head or block, a floating ring mounted on said head or block, a plurality of work engaging jaws mounted on said block and ring, and a plurality of coil springs positioned between said head and ring and urging said jaws to work engaging position.

3. In a chuck, a chuck head or block, a floating ring mounted on said head or block, said ring having a plurality of hollow portions, a plurality of work engaging jaws secured to said block and ring, and a plurality of springs mounted in said hollow portions and between said ring and block and urging said jaws to work engaging position.

4. In a chuck, a chuck head or block, a floating ring mounted on said head or block, said ring having a plurality of recesses, means rigid with said block extending into said recesses, a spring in each recess between said means and ring, and a plurality of jaws mounted on said block and ring and urged by said springs to work engaging position.

5. In a chuck, a chuck head or block, a floating ring mounted on said head or block, said ring having a plurality of recesses, a plurality of pins rigid with said block and extending into said recesses, a plurality of springs in said recesses between said pins and ring, and a plurality of work engaging jaws mounted on said ring and urged to work engaging position by said springs.

6. In a chuck, a chuck head or block, a ring abutting said head or block, means rigidly secured to said head and engaging said ring to movably hold the same on said head, and a plurality of work engaging jaws mounted on said chuck.

7. In a chuck, a chuck head or block, a ring abutting said block, a shoulder on said ring, means rigidly secured to said head, a flange on said means engaging said shoulder to movably hold said ring on said head, and a plurality of work engaging jaws mounted on said chuck.

8. In a chuck, a chuck head or block, a ring, means for movably holding said ring on said block, a plurality of work engaging jaws mounted on said block and ring, and means secured to said jaws and entering openings in said holding means to limit and guide the movement of said jaws on said ring.

9. In a chuck, a chuck block or head, a ring, means concentric with said ring to movably secure it on said head, a plurality of work engaging jaws pivoted to said block and ring, means secured to said jaws and passing into openings in said first named means to limit and guide the movement of said jaws, and resilient means interposed between said ring and head and urging said jaws to work engaging position.

In testimony whereof I affix my signature.

JAMES H. WAGNER.